Patented Nov. 15, 1938

2,136,384

UNITED STATES PATENT OFFICE 2,136,384

CELLULOSE DERIVATIVE COMPOSITIONS

Nicholas L. Kalman, Cambridge, Mass.

No Drawing. Application January 28, 1936,
Serial No. 61,251

11 Claims. (Cl. 134—79)

This invention relates to esters of an organic acid, and to compositions made from these esters; also to methods of preparing the esters and the compositions.

This application is a continuation in part of my application Serial No. 611,113, filed May 13, 1932, for Solvents. Reference is also made to my co-pending application Serial No. 33,661, filed July 29, 1935, which is in the nature of a companion case to the present one and in which the esters, and methods of making them, are particularly claimed.

The organic acid, from which the esters are derived, has never been obtained in substantially pure form heretofore, as far as I am aware, and has never been named; for purposes of ready identification I have given it the name "Cativic Acid", and will set forth hereinbelow its characteristics, and methods by which it may be obtained.

The raw material from which cativic acid is obtained is the exudate from the species of the tree called *Prioria copaifera*, Gris., which tree is found abundantly in parts of tropical and semi-tropical countries,—for example, along the Caribbean coast of Panama and Costa Rica. The exudate is properly called cativo resin, although it is also commonly called cativo (or cateva or catteva) balsam, and also by various local names. The natural exudate is usually a greenish brown, very tacky and viscous, opaque liquid, and has, especially when heated, an unpleasant odor. Attempts to use it commercially have heretofore been without success.

I have found that about 70 to 75% of this resin exudate is an organic acid. It is to this acid, which I have succeeded in isolating in a pure state, or substantially so, for the first time, by methods hereinafter disclosed, that I have given the name "Cativic Acid".

Cativo resin consists of about ½% water, 0.1% ash, up to 2% volatile oil, about ½% of an unidentified acid, which has a very much lower boiling point than cativic acid. The two major constituents of cativo resin are cativic acid, as mentioned above, consisting of about 70 to 75% of the material, and another substance consisting of about 22% of the material, which substance I have found to be an ester and have named Cativyl Cativate, as my work indicates that it is an ester product of cativic acid, and its corresponding alcohol. This alcohol I have isolated for the first time and have given it the name Cativyl alcohol.

I have developed several methods for obtaining cativic acid from cativo resin. In order that the present invention will be sufficiently clear and complete, I will first describe some of these methods, and cativic acid itself. Subsequently I will set forth the particular objects to which the present invention is directed,—namely, the esters of cativic acid and compositions made from them, and methods of preparing these.

Cativic acid is a very viscous and tacky substance; it is a semi-solid having a cold flow, and is colorless or substantially so, and nearly entirely odorless. All attempts at crystallization of this material have so far failed, and as in the case of similar high molecular weight non-crystallized and oxidizable organic acids, it is a very difficult matter to establish a precise chemical formula and absolute physical and chemical characteristics. It appears, however, to be a definite chemical compound, which may exist in one form or as a mixture of isomeric forms all having the same molecular formula, set forth below. Closely related compounds (having, for example, 2 carbon atoms more,—or less) may be present in traces; these would be practically impossible to isolate and identify. This chemical compound, which may or may not be present in isomeric form, I refer to as cativic acid. A series of combustions on samples of purified cativic acid give a mean of carbon 78.41%, and hydrogen 11.06%. This corresponds to a molecular formula of $C_{20}H_{34}O_2$. It will be readily apparent that the exact molecular formula of a substance having such a high molecular weight is not easy to determine. Hence this formula is advanced as being the most probable as far as I have been able to determine, and not as a positive and completely-proved formula. The mean acid number was found to be 172.3. Cativic acid has an unsaturated bond, but the iodine number determinations according to Wiji's method yield varying data according to the amount of sample taken, time of reaction, etc. Refractive index was found to be 1.507 at 15° C.; specific gravity 0.9987 at 23°C.; viscosity, 100 cc. pipette at 22° C., 78.5 hours; water under same conditions 11.6 seconds.

Cativic acid exhibits the properties of a monobasic acid, readily forming salts. It also readily forms esters, differing from abietic and other resin acids which esterify only with difficulty. Its composition in conjunction with the degree of unsaturation clearly differentiates it from the aliphatic acids. With a body of as high molecular magnitude as cativic acid, a small variation in percentage composition of hydrogen, oxygen and carbon produces a correspondingly greater apparent variation in composition, but from my researches, there is no compound of this composition or closely approaching the same which has the physical constants and other characteristics enumerated above and the ability of ready esterification.

Cativic acid is insoluble in water, but soluble in all the common organic solvents including generally aliphatic or aromatic hydrocarbons, alcohols, ketones, esters, ethers, chlorinated solvents, etc.

Among the methods which I have used for obtaining cativic acid I will mention a distillation process, a neutralization process, and a solvent process. Other processes are also possible, but need not be described here.

In carrying out the distillation process, I may first filter the cativo resin (which is advantageously warmed or dissolved in a suitable solvent, to improve its flow) in order to remove dirt and other foreign matter. This step, however, is not necessary. Then I subject it to heat and preferably to a slight vacuum, equal, say, to a pressure of 200 mm. of mercury, thereby driving off water and other low-boiling constituents. The pressure during this step may vary considerably. The remaining constituents,—cativic acid and cativyl cativate—do not distill while the temperature is below about 200° C., even at a very low absolute pressure. (Pressures, in this specification, are given in millimeters of mercury, and are absolute pressures.) Now, on raising the temperature about 200° C., with a low pressure (below 10 mm. preferably), cativic acid is distilled off, leaving kalmyl kalmate as the residue. Care should be taken, during the distillation, to keep the pressure low; with higher pressures (e. g. 10 mm. or over) there is a tendency for cativic acid to lose $CO_2$, forming the hydrocarbon which I call "Cativene". Cativene boils at about 160° C. at 3 mm. However, once the distillation of cativic acid is well under way, at the indicated low pressure, there is little or no further trouble from cativene formation, and any cativene which came over early in the distillation may be separated by further fractional distillation or by neutralization of the cativic acid, or by other suitable means. When the neutralization method is used, an alkali such as caustic soda together with a suitable solvent such as water is used, and the cativic acid separated from the other materials including cativene, in the same general way as outlined below under the neutralization process. There is also some tendency for cativic acid and its derivatives to oxidize especially at elevated temperatures. This can be avoided by distilling in the absence of oxygen,—e. g. in an atmosphere of nitrogen or carbon dioxide.

By the neutralization process for obtaining cativic acid, it is possible to obtain all the cativic acid contained in cativo resin, whether present as such, or combined with cativyl alcohol as cativyl cativate. A simple procedure is to heat or boil the cativo resin with an aqueous (or alcoholic, or aqueous-alcoholic) caustic solution, whereby the cativyl cativate is easily saponified. All of the resin, except for a small amount of dirt and like impurities, which are readily removed by filtration, is now in solution. Dilution, at least to a considerable degree, of this solution with water is possible, without apparent precipitation,—the cativyl alcohol being undoubtedly held by the soap solution. To separate these ingredients, the soap solution is shaken out with a solvent immiscible with water or the alkali cativate. Petroleum ether or ethyl ether may be used as such a solvent. The cativyl alcohol is thus dissolved out in the solvent phase, and may be recovered as desired. The alkali cativate, contained in the other phase, may be decomposed (hydrolyzed) in well-known manner by addition of a comparatively strong acid, whereby cativic acid is produced. Cativic acid may then be readily separated from the other materials,—which exist as a water solution of alkali salt, alcohol (if any has been used), and any excess of the strong acid,—since cativic acid is insoluble therein at the relatively high water-content then existing in said solution.

In carrying out the solvent process for obtaining cativic acid, the cativo resin is first treated with aqueous alcohol containing approximately 75% alcohol; cativic acid goes into solution but the undesirable impurities and other ingredients remain as a bottom sludge. The alcoholic-aqueous solution may be poured off or filtered, and cativic acid may be recovered therefrom in several ways. For instance, the alcohol solution may be distilled or diluted until the alcohol content is about 50% or less, in which mixture cativic acid becomes thereby substantially insoluble, and the acid thus separated may be, if so desired, taken up by a solvent immiscible with the 50% aqueous alcoholic solution, like petroleum ether or other aliphatic hydrocarbons, and thus separated. Cativic acid then may be recovered by evaporation of the solvent, preferably in a non-oxidizing atmosphere. Or, the 75% alcoholic solution may be shaken out with an immiscible solvent such as certain aliphatic hydrocarbons, part of cativic acid going into the hydrocarbon solution. After the separation of the solvent, the 75% alcoholic solution containing some cativic acid may be used again for extraction of another portion of cativo resin, etc. and the solution freed from the solvent if so desired and cativic acid then obtained. Or, the solution may be used as such. The 75% alcoholic solution may be decolorized, or substantially so, if so desired, for instance, by adding sodium hydrosulphite in the amount of .2% of the total weight, shaking out for a while, possibly gently heating, and preferably filtering. Decolorization of color imparting constituents of cativic acid may be also accomplished by sunlight, or by sources of suitable artificial light which has an excellent decolorizing effect thereon, especially in solution.

I have found that cativic acid yields esters when esterified with alcohols. These artificial esters had not, to my knowledge, been produced prior to my invention and are therefore regarded as new chemical compounds which are comprised within the scope of this invention. I have found that these new artificial esters possess valuable and unique properties which constitute them valuable and useful industrial products, and which are described more in detail below.

I have found that cativic acid can be esterified with ease, according to usual methods of esterification, preferably using a small amount (for instance, 2%) of a catalytic agent such as $H_2SO_4$ or $HCl$. The esters may be prepared directly from cativo resin, by adding the respective alcohol to the resin, preferably with the assistance of a small amount of mineral acid. The esterification takes place quickly and may be further hastened by heating. The mineral acid and the excess of alcohol may form a layer immiscible with the ester and be thus separated; or they may be washed out by water, or the whole reaction product may be distilled and the alcohols, boiling very much lower than the corresponding cativic acid esters, may be separated by distillation, preferably first at atmospheric pressure and then in vacuum. Any small amount of unesterified cativic acid may be eliminated from the reaction mixture by neutralizing with an alkali, such as caustic soda (which will, of course, first neutralize the acid catalysts), and washing out the soap with water or preferably (to avoid any hydrolysis) with an aqueous-alcoholic mixture containing approximately 50% alcohol.

For the preparation of those esters, like glyceryl cativate or triethylene glycol cativate, which can be distilled only with difficulty, if at all, in the usual vacuum used commercially, in order to obtain a pure product, free of the original ester and coloring matter present in the cativo resin, cativic acid is prepared at first by any of the methods described above, then the high boiling alcohol is added and the mixture heated until the reaction is completed. If the reaction temperature is higher than the boiling point of the alcohol, the esterification should preferably be carried out in a closed vessel under pressure. In this instance it is advantageous to suspend above the reaction mixture an agent, such as CaO, which absorbs the water formed, but does not react with the refluxing alcohol. By thus removing one of the products of reaction, the progress of the reaction in the proper direction is, of course, promoted. For the preparation of these esters the reaction temperature of which is relatively high, an arrangement is suitable which will permit the evaporation of the water formed by the reaction and eliminate it from the reaction mixture and, at the same time, permit refluxing the alcohol used for esterification. In order to obtain a light colored ester, the esterification is advantageously carried out in a non-oxidizing atmosphere, viz., in nitrogen, hydrogen, etc. This method of esterification may be hastened by the addition of aluminum or zinc, or their derivates, as is the case in the preparation of other similar esters by the same method.

The esters of cativic acid range from slightly viscous liquids to semi-solid thermoplastic resins exhibiting slow cold flow. If properly prepared they will be entirely or substantially colorless and odorless. As a general rule they are soluble in all the ordinary solvents and only a few of them are insoluble or poorly soluble in the lower alcohols such as methyl and ethyl alcohol. These esters are compatible with and/or solvents for a great variety of chemicals and products, and are most useful ingredients in compounding a great number of commercial preparations. Their usefulness, for instance, in the cellulose ester and ether arts is manifold, some of them being gelatinizers, others non-solvent softeners, and still others resinous materials compatible with nitrocellulose. Some boil at a very high temperature; others can not be distilled at all under the vacuum usually employed. They are all unaffected by cold water and substantially so by boiling water. Compositions of cellulose esters or ethers with some of them are unaffected by lower alcohols. The incorporation of most of these cativic esters in cellulose esters and ethers gives products having an excellent adhesion to glass, metal, paper, textiles, etc. The nitrocellulose films, for instance, with cativic esters admixed have excellent clarity, gloss and tensile strength, the films being dry, non-tacky, and non-oily, even after the addition of such large amounts as 125 per cent of these esters to the cellulose base.

Dopes prepared from nitrocellulose and cativic esters have low viscosities, permitting the preparation of lacquers of high solids content, are free flowing and quick leveling, and free from orange peel. As the esters are miscible with all the solvents commonly used in the cellulose arts they facilitate the compounding of the dopes, and also enable the use of low cost solvents. Furthermore, as these esters may be easily prepared with very low acid numbers, they are suitable vehicles in the preparation of pigment pastes; even the basic type pigments will not cause any jelling or livering. As the cativic acid esters are tasteless, substantially odorless and non-toxic, the cellulose derivative products prepared with them may be used for lacquers, films, etc. to be in contact with foodstuffs. These esters are compatible with most of the resins used in cellulose derivative arts, and thus may be advantageously used in combination with such resins to bring about modifications in the characteristics of the resulting films or products. As most of the esters have excellent waterproofing qualities, the incorporation of them insures a high degree of durability of the compounded cellulose products. Films prepared by the incorporation of cativic esters with cellulose esters or ethers dry as fast as, or in some cases even faster than, films prepared with other commonly used resins, resin-plasticizers, or plasticizers. In addition to their applicability in connection with compounds and derivatives of cellulose, these cativic acid esters are useful agents for a wide field of processes such as coating, impregnating, water-proofing, plasticizing, etc., both alone and in connection with other substances.

To illustrate valuable points I shall enumerate some of the synthetic esters of cativic acid prepared and studied by me. Methods by which these esters are prepared are included in detail.

It will be evident from statements hereinbefore made, as well as from the examples to follow, that variations in the procedure for esterification are permissible. These variations, however, are in details only and there is no fundamental difference between the various examples. Each particular example happens to be a preferred way of making the particular ester described thereunder, but considerable choice in procedures is permissible as will be evident from a study of this disclosure. Differences between the examples are due primarily to differences in boiling point and solubilities of the ingredients and products, with the accompanying necessity for different procedures for distilling and separating.

*Methyl cativate.*—To cativo resin an excess of methyl alcohol is added and if so desired the resulting solution may be filtered, but this is not essential. After the addition of a small amount (say, 2% on the resin) of concentrated acid, such as $H_2SO_4$, a practically immediate formation of two layers may be observed. Some part of the ester is formed practically instantaneously. In order to complete the esterification, the reaction mass is heated and refluxed for about 3 or 4 hours. There is a rapid separation into two layers, the lower layer containing the ester with a small amount of methyl alcohol, the upper layer the excess of methyl alcohol with $H_2SO_4$. The lower layer may be drawn off and if so desired washed once or twice with water or a small amount of methyl alcohol, or a water-methyl alcohol mixture, in order to eliminate the last parts of $H_2SO_4$, still present in the ester. The still unesterified cativic acid may be eliminated by the addition of alkali either in aqueous or alcoholic solution until phenolphthalein or any other suitable indicator will show the presence of an excess of alkalinity. Of course this neutralization should be preferably done while the ester is cold, otherwise the neutralization of cativic acid might be accompanied by the simultaneous partial saponification of the ester already formed. In case the cativic acid has been saponified, the soap may be subsequently washed out with water or a mixture of water and alcohol. Now the reaction mass contains not only methyl cativate but also the coloring matter present originally and any formed during the esterification, and the original ester, cativyl cativate, present in cativo resin. The pure methyl cativate may be readily obtained by vacuum distillation. Such a product has an acid number of less than 1.

Cativic acid may replace the cativo resin as the source of the acid, if desired. In such an event the procedure will be the same as that just described, except for obvious differences (as in materials to be separated, for instance). However, this involves the extra step of making cativic acid, which would preferably be avoided, in commercial operations at least.

Methyl cativate prepared by the methods described above is a substantially odorless and colorless slightly viscous liquid. Characteristics of a representative sample are: boiling point 210-211° C. at 15 mm. pressure; sp. gr. 0.9739 at 20° C.; viscosity, 50 cc. pipette at 23.5° C., 170.6 seconds (water under some conditions, 17.8 seconds).

Methyl cativate is compatible with nitrocellulose even to the extent of 100 parts of nitrocellulose and 200 parts of methyl cativate, such films being clear, flexible, and having an excellent gloss. A film compounded from equal parts of nitrocellulose and methyl cativate, for instance, has a good adhesion to glass, metal, etc., and is clear, non-tacky, soft, and glossy.

*Ethyl cativate.*—This is prepared in accordance with the methods described for making methyl cativate. It is substantially colorless and odorless, and is a limpid liquid, boiling at about 210-211° C. at 8 mm. pressure. A representative sample shows: sp. gr. 0.9760 at 20° C.; viscosity, 50 cc. pipette, at 23.5° C., 177.8 seconds; refractive index 1.4910 at 22.5° C. Ethyl cativate is insoluble in water, and miscible with aliphatic and aromatic hydrocarbons, ethers, ketones, esters, etc. It has excellent compatibility with nitrocellulose and ethyl cellulose, even as much as 200 parts of ethyl cativate admixed with 100 parts of nitrocellulose yielding films which are clear, soft and glossy, and with good adhesion to glass and other materials.

*Normal butyl cativate.*—Normal butyl cativate may be prepared by mixing cativo resin with an excess of butyl alcohol and, say, 2% concentrated sulphuric, hydrochloric or other strong acid, calculated on the weight of the cativo resin. The mixture is refluxed at about 90° C. for 3 or 4 hours; then the mineral acid used is washed out with water, or neutralized, for example, with a slight excess of calcium carbonate. Advantageously, it may be filtered at this point. Then, if so desired, any still-unesterified cativic acid may be neutralized with an aqueous or alcoholic alkali solution, let us say of a strength of 1%, and the soap solution washed out with water or aqueous-alcohol. As the soap itself is stable at the boiling point of the cativic acid ester, it may be left in the reaction mixture without eliminating it, but then it should be borne in mind that while distilling the alcohol and/or water, the soap solution might foam and thus might make the distillation, due to the possible over-foaming, more difficult. The whole reaction product with or without the soap, or with or without the unesterified and admixed cativic acid, is subjected to vacuum distillation. Water, any excess butyl alcohol and any impurities distill off at comparatively low temperature, all of them under 200° C. in the neighborhood of 20 mm. pressure or less. When this point is reached the receiver is changed, and the butyl cativate is distilled off. If the cativic acid was not previously eliminated, as described above, some part of it is liable to contaminate the butyl ester and, as the cativic acid on distillation may decompose into the hydrocarbon to some extent, this hydrocarbon is then also present in the butyl ester. As the hydrocarbon boils very much lower than the butyl ester, a fractionated distillation will eliminate this contamination from the major part of the distillate. Normal butyl cativate is an essentially colorless and odorless limpid liquid, boiling at about 201-202° C. at 2½ mm. pressure. A sample prepared as above described shows: sp. gr. 0.9511 at 20° C.; viscosity, 50 cc. pipette at 23.5° C., 129.6 seconds (water under same conditions 17.8 seconds); refractive index 1.4870 at 22.5° C. Normal butyl cativate is insoluble in water, and soluble in methyl and ethyl alcohols, and methyl-ethyl ketone. It is miscible with propyl and butyl alcohols, ethyl ether and petroleum ether, acetone, aliphatic and aromatic hydrocarbons and esters. It has excellent compatibility with nitrocellulose and ethyl cellulose, even as much as 200 parts of butyl cativate admixed with 100 parts of nitrocellulose yielding a film which has only a trace of tackiness. A film of equal parts of nitrocellulose and normal butyl cativate is dry, soft, and has good adhesion to metal, glass, etc.

*Iso-amyl cativate.*—This may be prepared in the manner described for normal butyl cativate. It distills at about 221° C. at 3½ mm. pressure. Its acid number, for instance, is less than 3. It is a substantially colorless and odorless, slightly viscous liquid insoluble in water, methyl or ethyl alcohol, but miscible in aliphatic and aromatic hydrocarbons, esters and ketones. It is compatible to quite an extent with nitrocellulose, a film consisting of equal parts of nitrocellulose and iso-amyl cativate being non-tacky and clear.

*Cellosolve cativate* (cativic acid ester of ethylene glycol monoethyl ether).—Cellosolve cativate may be prepared by dissolving cativo resin in excess of "Cellosolve" (which is a trade name for ethylene glycol monoethyl ether) and leading anhydrous HCl gas into it with or without previous filtration of the reaction mass. Other strong acid catalysts may be used instead of HCl. As the reaction mass is very viscous, it is advantageous to have it well stirred, or to employ more Cellosolve, or to use a non-reacting additional anhydrous solvent, preferably of low viscosity, such as acetone or petroleum ether. The HCl gas may be led into the mixture at a low temperature while immersing the reaction mixture in an ice bath and then towards the end of esterification raising the temperature, or one may proceed by esterifying at a relatively high temperature, about the boiling point of the water but below the boiling point of the Cellosolve. In this manner the HCl gas will carry with it the water formed and, eliminating thus the water of the reaction, facilitate the quick and more thorough formation of the ester. After the esterification is completed, in case the water was not eliminated as above described, there are two layers present. The lower layer is the aqueous—HCl layer, and the upper layer is the ester layer. This upper layer may, with or without filtration, be subjected to vacuum distillation and after the Cellosolve and the other impurities still present in this layer are distilled over, the Cellosolve ester of cativic acid distills at a much higher temperature and may be so separated in a pure or nearly pure state. One may also proceed by subjecting the whole reaction mass after esterification to vacuum distillation, and everything that goes over below 200° at about 20 mm. pressure or less is rejected or recovered separately, and then the Cellosolve ester is obtained at a temperature specified below (i. e. about 224° C. at 2½ mm.). Another modification for recovering the esterified reaction product lies in washing out the excess Cellosolve, and the HCl, with water. When a sufficient amount of water is admixed with the reaction mass to counteract the solvent action of the Cellosolve on the ingredients, the resulting Cellosolve—water mixture will dissolve only negligible amounts of ester. The two layers may be separated and the ester layer washed anew if so desired. Cellosolve cativate, when carefully prepared, has an acid number of less than 1. It is a colorless, odorless liquid boiling at about 224° C. at 2½ mm. pressure. A representative sample shows: sp. gr. 0.9748 at 20° C.; viscosity, 50 cc. pipette at 23.5° C., 143.4 seconds (water under the same conditions 17.8 seconds); refractive index 1.4854 at 22.5° C.; ester number 149.4. Cellosolve cativate is insoluble in water and miscible with all the common solvents. It is excellently compatible with nitrocellulose and ethyl cellulose. A film containing 200 parts of Cellosolve cativate and 100 parts of nitrocellulose is clear, soft, and only slightly tacky. A film containing equal amounts of these two constituents is clear, dry, and non-tacky, and has very good adhesion to glass, metal, etc.

*Methyl cellosolve cativate (cativic acid ester of ethylene glycol monomethyl ether).*—This is prepared in the same way as Cellosolve cativate, but using methyl Cellosolve in place of Cellosolve. It is a substantially colorless and odorless liquid, boiling at 243° C. at 5½ mm. pressure. A representative sample shows: sp. gr. 0.9833 at 20° C.; viscosity, 50 cc. pipette at 23.5° C., 167.6 seconds (water under same conditions 17.8 seconds); refractive index 1.4897 at 24° C.; ester number 150.8. Methyl Cellosolve cativate is insoluble in water, and miscible with common organic solvents. It has a gelling action on nitrocellulose, and excellent compatibility therewith. A film compounded of equal proportions, for instance, of nitrocellulose and methyl Cellosolve cativate, is clear, dry, soft and non-tacky, having high tensile strength, and good adhesion to glass, metal, etc.

*Butyl cellosolve cativate (cativic acid ester of ethylene glycol monobutyl ether).*—This ester may be prepared by dissolving cativo resin in an excess of Butyl Cellosolve, and esterifying with a small amount of concentrated sulfuric acid. After the esterification is completed, the sulfuric acid and the still unesterified cativic acid are neutralized, the ester layer mechanically separated, and then vacuum distilled. Of course, the process might be modified by any of the other suitable variants, mentioned in the preparation of other esters herein described. The Butyl Cellosolve cativate thus obtained is a substantially colorless and odorless viscous liquid. It distills at about 240° C. at 2½ mm. pressure. A carefully prepared sample showed an acid number of zero. It is insoluble in water, and completely soluble in ethyl alcohol, acetone, toluene and high-boiling aliphatic hydrocarbons, among others. It is compatible with nitrocellulose and ethyl cellulose. A film compounded of equal proportions, for instance, of nitrocellulose and butyl cellosolve cativate is clear, non-tacky, moderately soft, dry, and has good gloss and high tensile strength, and excellent adhesion to glass.

*Glyceryl cativate.*—This product is prepared by heating cativic acid with glycerine (slightly in excess if desired), preferably in a non-oxidizing atmosphere and possibly in presence of aluminum. This reaction may be made at atmospheric pressure, or above, but is preferably carried out at reduced pressure. It is somewhat more satisfactory to perform this reaction in a vacuum, as the still-present foreign constituents, such as the excessive glycerine or possibly small amounts of cativene can thus be completely eliminated without any darkening or decomposition of the glyceryl ester formed. For an example, I shall describe herein the reaction under these conditions. A pressure of, say, 150 to 250 mm. is used, the reactants are heated up and the reaction starts under 200° C., the water formed by the esterification distilling off. The temperature is slightly raised and the reaction is finished in approximately 3 hours. The final temperature might be about 250°. Then the pressure is carefully lowered so as to enable the distillation of the admixed products and yet avoid sudden foaming over. Everything distills over except the glyceryl cativate which remains in the reaction vessel and after some cooling in a non-oxidizing atmosphere, may be taken out therefrom. Glyceryl cativate thus obtained has a low acid number, and is a colorless or light yellow, odorless, semi-solid thermoplastic with a cold flow. Tests on a sample showed: sp. gr. 1.0537 at 20° C.; viscosity, 25 cc. pipette at 250° F., 1850 seconds (water under same conditions 11.4 seconds); refractive index 1.5135 at 22.5°. It is insoluble in water and methyl alcohol; slightly soluble in ethyl alcohol; soluble in propyl and butyl alcohols, methyl and butyl acetates, ethyl and petroleum ether, toluene and xylene. It is very soluble in ethyl and propyl acetate, acetone and methyl ethyl ketone, benzene and higher-boiling aliphatic hydrocarbons. A film containing, for instance, equal parts of nitrocellulose and glyceryl cativate is clear, non-tacky and soft. It has excellent adhesion to glass, metal etc.

*Ethylene glycol cativate* is prepared by the same method as glyceryl cativate, except that, since ethylene glycol has a comparatively low boiling point (192° C. at 760 mm.) the reaction is carried out at atmospheric pressure, rather than below. Furthermore, as the reaction temperature is practically identical with the boiling point of ethylene glycol, the latter should be used in greater excess than in the case of the glycerine.

*Mixed acetic and cativic acid ester of glycerine.*—This product may be prepared by mixing 100 grams of cativic acid and 36 grams of acetin, which has a saponification number of 529 and thus contains mono- and di-acetin in about equal proportions. This is heated in a non-oxidizing atmosphere, at approximately 250 mm. pressure. The reaction starts under 200° C., the temperature being raised slightly and 250° C. being reached in about 3 to 4 hours at which time the reaction is completed. Then the vacuum is raised, and the excess of acetin (with some liberated acetic acid, uncombined cativic acid and any cativene present), is distilled off. The remaining reaction product, the combined acetic- and cativic acid ester of glycerine was found to have an acid number of about 2, and was a light yellow, practically odorless, exceedingly viscous liquid which could not be distilled under the usual vacuum. It is not soluble in water or alcohol, but soluble in aliphatic and aromatic hydrocarbons, esters, and ketones. It has excellent compatibility with nitrocellulose. A film containing, say, 2 parts of this mixed cativic acid ester and 1 part of nitrocellulose is clear, non-tacky, very soft, and has a brilliant gloss. It has remarkable adhesion to glass, metal, etc.

*Mixed ester of cativyl cativate and glyceryl cativate.*—This product may be prepared by filtering cativo resin by itself or in a solvent, and then adding a slight excess of glycerine calculated to neutralize the cativic acid present in the cativo resin. Then the product is heated and the reaction performed as described under glyceryl cativate. The other impurities present in cativo distill over and there remains behind a transparent, brown, thermoplastic semi-solid, which may be, if so desired, subsequently decolorized. The acid number obtained was less than 3. This ester is not soluble in water and only partially in ethyl alcohol and almost completely in acetone. It is miscible with the aliphatic and aromatic hydrocarbons and esters.

*Triethylene glycol di-cativate.*—This ester (also referred to herein as triethylene glycol cativate) may be prepared as described above for glyceryl ester, or mixed glycerine ester of acetic acid and cativic acid, namely by heating cativic acid with triethylene glycol without an acid catalyst. The resulting product is a substantially colorless and odorless, exceedingly viscous liquid. A representative sample of triethylene glycol di-cativate thus prepared was found to have an acid number of 1. It is insoluble in water, practically insoluble in ethyl alcohol, and completely soluble in acetone, toluene and high-boiling aliphatic hydrocarbons, and certain other solvents. It has an excellent compatibility with nitrocellulose and ethyl cellulose. A film composed of, say, 2 parts of triethylene glycol di-cativate and 1 part of nitrocellulose is clear and soft. A film composed of equal parts of these two constituents is clear, non-tacky, soft, and has excellent adhesion to glass, metal, etc.

*Triethylene glycol mono-cativate* is conveniently prepared by heating cativic acid with, preferably, a considerable excess of triethylene glycol. As an example: 150 parts (by weight) of cativic acid was heated with 150 parts of triethylene glycol, in an inert atmosphere, and at 150–250 mm. to about 180° C., where the esterification began. The temperature was slowly raised, and reached about 230° C., in 4 hours. Meanwhile the reaction water was distilled out of the reaction mixture. Then the pressure was lowered, and the excess of triethylene glycol distilled over at about 150° C. at 4 mm. Then the receiver was changed, and the triethylene glycol mono-cativate distilled at about 270° C. at 1 mm. Triethylene glycol di-cativate remained behind as a residue. A representative specimen of triethylene glycol mono-cativate had an acid number of 3.2 and an ester number of 123.1.

The foregoing are certain illustrations of esters of cativic acid and their preparation, which esters are referred to as artificial esters, since they result from the esterification of the cativic acid component of cativo resin with alcohols which are derived from other sources than cativo resin and since they do not occur naturally either in cativo resin or in any other known substance. While illustrations of artificial esters of cativic acid have been given, it is to be understood that the artificial esters of cativic acid within the scope of this invention are not limited to the illustrations that have been given. However, from the illustrations given the production of other artificial esters can be readily accomplished by anyone desiring to practice this invention.

As distinguished from the artificial esters of cativic acid above mentioned, I have found that cativo resin contains a unique substance which is believed by me to be an ester and which I have called cativyl cativate. Cativyl cativate is, when obtained in a pure or substantially pure state, totally different from the resin. It may be obtained by filtering cativo resin with or without dissolving it, and then neutralizing the acids present in the cativo. Subsequently the alkali salts so obtained may be washed out with water or aqueous alcohol leaving behind cativyl cativate plus volatile oil present in cativo.

If so desired, this volatile oil may be eliminated in several ways, as, for instance, by vacuum distillation. It distills under 200° C. at the neighborhood of 10 mm. pressure, while cativyl cativate is unaffected under these conditions. It may be also eliminated by steam distillation, the volatile oil distilling more difficultly under this treatment than the usual terpenes. After any of these treatments, cativyl cativate remains behind as brown, very viscous liquid. Furthermore, while cativo resin is opaque, and has an objectionable odor and high acid number, cativyl cativate, as obtained in any of the processes just described, is transparent, substantially odorless or having a slight pleasant odor, and either neutral or nearly so. In this manner a product is obtained by these chemical and physical manipulations that is unknown in the natural state, and the improvements in the characteristics of the purified product enable it to be used for purposes for which the natural product could not possibly be considered. For instance, cativyl cativate purified in the above manner may well be used as plasticizer for paints, containing even basic pigments, for which the cativo resin with its high acid number could not be used.

The unique characteristics of both the esters themselves and of nitrocellulose films in which these esters are incorporated make them particularly suitable for a number of practical commercial applications.

The esters are compatible with nitrocellulose and cellulose ethers, generally even in high proportions, and are preferably added to part of the lacquer solvent or diluent to facilitate mixing. Or, if desired, the cativic acid esters may be added to the base lacquer directly without admixture with solvent. In addition to maintaining a high solids content in the mixture by this feature, the esters have the additional property of decreasing the viscosity of the base lacquers to which they may be added, which fact again permits of even greater solids content than is obtained with materials combining the action of both plasticizer and resin for nitrocellulose. Other agents such as are well-known in the plastics art may be added if desired.

Such films are further characterized by flexibility combined, in certain of them, with good tensile strength and freedom from tackiness and printing.

The adhesion to metal, glass, paper, textiles, etc. of lacquers in which these esters have been incorporated is in most instances excellent. This fact alone would not be unique except for the flexible characteristics which they simultaneously impart to the films.

The esters are suitable media for the grinding of pigment pastes. Their value in this connection, however, resides in the fact that the esters may be prepared with such low acid numbers that even pigments of a basic nature may be used without danger of interaction and resultant thickening or livering of the vehicle.

The color of the esters may vary from water white to yellow depending largely upon the care in the preparation of both the acid and the ester made therefrom. With due care in their preparation the lower molecular weight esters will be almost water white, while those of highest molecular weight will usually be light yellow.

Their low vapor pressures even at elevated temperatures, insure the permanency of flexibility of films comprising them.

Also, in contrast to lacquers prepared from nitrocellulose with many materials which act as a resin and/or softener therewith, the cativic acid esters do not substantially retard the evaporation of solvent from nitrocellulose films containing them even at high ratios of ester to nitrocellulose. Films deposited by spraying likewise exhibit no marked tendency to orange peel even from solutions prepared with highly volatile organic solvents and diluents.

As some of the esters are insoluble in alcohol, lacquer films in which these have been incorporated exhibit marked resistance to it, varying with the amount of such esters so incorporated. This is a characteristic of all films of nitrocellulose and alcohol resistant materials. But while most of the films prepared with any of the esters of cativic acid will be slightly softened by alcohol immersion, few of them turn white or blush to any appreciable extent on such immersion. It is important, however, in making such tests to be certain that all of the solvent has been removed from the film under test, otherwise an erroneous indication of blushing may result. Most of the films when free of solvent are water resistant.

The almost complete absence of odor, taste and color associated with lacquer films in which these esters have been incorporated make them especially adaptable to uses in connection with wrappers, containers or lining, for food containers, likewise for many other uses where any one or all of these features may be a factor in their selection.

Esters of cativic acid with nitrocellulose or cellulose ethers have practical applications as adhesives, for making artificial leather, as flexible coatings for paper and textiles, lacquers for wood and metal, enamels, and many other purposes.

These uses of cativic acid esters are not confined to their association with cellulose derivatives. The esters find use, for example, as plasticizers in various coating compositions; as modifiers in conjunction with varnish resins with which they may be compatible; with adhesive compositions of several kinds; and as agents for improving the resistance to water of many materials which otherwise have inadequate water-resistance.

Cativic acid as such or in the form of certain of its esters finds use as an agent for modifying, plasticizing, or otherwise affecting the properties of various synthetic resins. For example, in the case of synthetic resins, such as those of the phenol-formaldehyde type where an esterifiable —OH group is present, cativic acid may be added to the ingredients, either before, during, or after their condensation or polymerization, thereby apparently producing simple or mixed cativic acid ester or esters of the resin or of one or more of its ingredients. One or more esters of cativic acid may be added to the resulting product. In a similar manner, glycerine, phthalic anhydride, and cativic acid may be reacted together; they form a resinous, plastic composition which may be a mixture of synthetic resin of the "glyptal" type and glyceryl cativate. The exact nature of the composition and the components thereof, will vary in accordance with the relative proportions of the ingredients. A product of the same type may be obtained by substituting glyceryl cativate for cativic acid, in whole or in part.

A further use for cativic acid esters is found to be in conjunction with shellac. In this connection, I have found, for example, that triethylene glycol mono-cativate has beneficial effects, on shellac, notably as a plasticzer and water-repellent, and when mixed therewith in the proportion of, say, two parts shellac to one part ester, gives a product which is homogeneous, transparent, water-repellent, and rubbery, and quite resilient.

As a specific example I will describe the preparation of a lacquer which will be satisfactory as a flexible coating for a starch-sized textile and will provide good adhesion, gloss, flexibility, and protection to the size without appreciable stiffening of the fabric. The degree of waterproofing afforded the textile will depend largely on the amount and method of application thereto.

The following ingredients:

| | Parts |
|---|---|
| 15 percent solution of 5-second nitrocellulose in suitable solvents for same | 100 |
| Methyl ester of cativic acid | 22.5 to 30 | are mixed and diluted to the viscosity desired. Without dilution the above proportions will yield a viscous dope suitable for application by coating bars or the like.

In my co-pending application, Serial No. 664,551, filed April 5, 1933, I describe heavy metal salts of cativic acid and methods of making them. One method described is that wherein cativic acid, either alone or as an ingredient of another substance such as cativo resin, is taken up with a suitable solvent, such as one of the high-boiling aliphatic hydrocarbons generally used as solvents, and then treated with a finely-divided compound of the desired metal in the presence of heat and agitating means. The compound of the metal may be an oxide, hydroxide, acetate, etc. The solvent should preferably also be a solvent for the metal cativate produced, which latter is thus separated in its solvent from the inorganic reactants, and may then be used as such in solution or else recovered as the metal salt free from solvent.

The esters of cativic acid have been mentioned above as plasticizers and for several other purposes. A further example of their usefulness along these lines is with the metal cativates. With aluminum cativate, for instance, they act as plasticizers. Aluminum cativate has the property, unusual among aluminum compounds of forming a clear, transparent film. This film, however, is brittle and relatively inflexible; but by the use of a suitable ester of cativic acid the film may be plasticized as desired. The ester used, and the amount, will depend of course upon the degree of plasticity desired, and may be selected from among those already described in detail in accordance with the properties given. The ester and the metal cativate are merely mixed, with the aid of suitable common solvents, and the solution then filmed or sheeted out in accordance with ordinary practice. Other materials such as nitrocellulose or other cellulose derivatives may be added. Thus, three parts nitrocellulose and two parts each of aluminum cativate and glyceryl cativate, mixed with the aid of common solvents and sheeted, form a clear, transparent, colorless film.

When I refer to "alcohol" in the claims, it should be understood, of course, (as is evident from the examples and other statements in the specification) that I am not limited merely to simple alcohols. Complex alcohols, polyhydric alcohols, aromatic, and aliphatic, and substituted alcohols can be used; the criterion being that the compound shall contain one or more esterifiable —OH groups,—i. e. groups which will unite with the —H of the acid group (—COOH) of organic acids to form water, whereby simultaneously an ester is formed from the acid and the alcohol.

I claim:

1. A composition of matter comprising a cellulose derivative and an ester of cativic acid.
2. A composition of matter comprising an ester of cativic acid and a cellulose derivative of the group consisting of cellulose nitrate and cellulose ethers.
3. A composition of matter comprising cellulose nitrate and an ester of cativic acid.
4. A composition of matter comprising a cellulose ether and an ester of cativic acid.
5. A composition of matter comprising ethyl cellulose and an ester of cativic acid.
6. A composition of matter comprising a cellulose derivative, a metal cativate, and an ester of cativic acid.
7. A composition of matter comprising a cellulose derivative, of the group consisting of cellulose nitrate and cellulose ethers, a metal cativate, and an ester of cativic acid.
8. A composition of matter comprising a metal cativate and an ester of cativic acid.
9. A composition of matter comprising a cellulose derivative and butyl cativate.
10. A composition of matter comprising a cellulose derivative and a mixed acetic and cativic ester of glycerine.
11. A composition of matter comprising a cellulose derivative and the cativic acid ester of ethylene glycol monomethyl ether.

NICHOLAS L. KALMAN.

CERTIFICATE OF CORRECTION.

Patent No. 2,136,384. November 15, 1938.

NICHOLAS L. KALMAN.

It is hereby certified that error appears in the printed specification of the above numbered patent requiring correction as follows: Page 1, second column, line 40, for "Wiji's" read Wij's; page 2, first column, line 36, for "kalmyl kalmate" read cativyl cativate; and that the said Letters Patent should be read with this correction therein that the same may conform to the record of the case in the Patent Office.

Signed and sealed this 10th day of January, A. D. 1939.

(Seal)

Henry Van Arsdale
Acting Commissioner of Patents.

tion or else recovered as the metal salt free from solvent.

The esters of cativic acid have been mentioned above as plasticizers and for several other purposes. A further example of their usefulness along these lines is with the metal cativates. With aluminum cativate, for instance, they act as plasticizers. Aluminum cativate has the property, unusual among aluminum compounds of forming a clear, transparent film. This film, however, is brittle and relatively inflexible; but by the use of a suitable ester of cativic acid the film may be plasticized as desired. The ester used, and the amount, will depend of course upon the degree of plasticity desired, and may be selected from among those already described in detail in accordance with the properties given. The ester and the metal cativate are merely mixed, with the aid of suitable common solvents, and the solution then filmed or sheeted out in accordance with ordinary practice. Other materials such as nitrocellulose or other cellulose derivatives may be added. Thus, three parts nitrocellulose and two parts each of aluminum cativate and glyceryl cativate, mixed with the aid of common solvents and sheeted, form a clear, transparent, colorless film.

When I refer to "alcohol" in the claims, it should be understood, of course, (as is evident from the examples and other statements in the specification) that I am not limited merely to simple alcohols. Complex alcohols, polyhydric alcohols, aromatic, and aliphatic, and substituted alcohols can be used; the criterion being that the compound shall contain one or more esterifiable —OH groups,—i. e. groups which will unite with the —H of the acid group (—COOH) of organic acids to form water, whereby simultaneously an ester is formed from the acid and the alcohol.

I claim:

1. A composition of matter comprising a cellulose derivative and an ester of cativic acid.
2. A composition of matter comprising an ester of cativic acid and a cellulose derivative of the group consisting of cellulose nitrate and cellulose ethers.
3. A composition of matter comprising cellulose nitrate and an ester of cativic acid.
4. A composition of matter comprising a cellulose ether and an ester of cativic acid.
5. A composition of matter comprising ethyl cellulose and an ester of cativic acid.
6. A composition of matter comprising a cellulose derivative, a metal cativate, and an ester of cativic acid.
7. A composition of matter comprising a cellulose derivative, of the group consisting of cellulose nitrate and cellulose ethers, a metal cativate, and an ester of cativic acid.
8. A composition of matter comprising a metal cativate and an ester of cativic acid.
9. A composition of matter comprising a cellulose derivative and butyl cativate.
10. A composition of matter comprising a cellulose derivative and a mixed acetic and cativic ester of glycerine.
11. A composition of matter comprising a cellulose derivative and the cativic acid ester of ethylene glycol monomethyl ether.

NICHOLAS L. KALMAN.

CERTIFICATE OF CORRECTION.

Patent No. 2,136,384. November 15, 1938.

NICHOLAS L. KALMAN.

It is hereby certified that error appears in the printed specification of the above numbered patent requiring correction as follows: Page 1, second column, line 40, for "Wiji's" read Wij's; page 2, first column, line 36, for "kalmyl kalmate" read cativyl cativate; and that the said Letters Patent should be read with this correction therein that the same may conform to the record of the case in the Patent Office.

Signed and sealed this 10th day of January, A. D. 1939.

(Seal)

Henry Van Arsdale
Acting Commissioner of Patents.